United States Patent
Jahn

(10) Patent No.: US 9,010,763 B2
(45) Date of Patent: Apr. 21, 2015

(54) LEAF SEAL

(71) Applicant: Rolls-Royce PLC, London (GB)

(72) Inventor: Ingo Henry Johannes Jahn, West End (AU)

(73) Assignee: Rolls-Royce PLC, London (GB)

( * ) Notice: Subject to any disclaimer, the term of this patent is extended or adjusted under 35 U.S.C. 154(b) by 213 days.

(21) Appl. No.: 13/673,319

(22) Filed: Nov. 9, 2012

(65) Prior Publication Data

US 2013/0119612 A1 May 16, 2013

(30) Foreign Application Priority Data

Nov. 14, 2011 (GB) .................................. 1119528.6

(51) Int. Cl.
*F02C 7/28* (2006.01)
*F16J 15/32* (2006.01)

(52) U.S. Cl.
CPC ............... *F02C 7/28* (2013.01); *F16J 15/3292* (2013.01)

(58) Field of Classification Search
CPC .................................................. F16J 15/3292
USPC ........................................................ 277/355
See application file for complete search history.

(56) References Cited

U.S. PATENT DOCUMENTS

| | | | |
|---|---|---|---|
| 5,135,237 A | 8/1992 | Flower | |
| 5,324,051 A | 6/1994 | Schivley, Jr. | |
| 6,267,381 B1 | 7/2001 | Wright | |
| 6,343,792 B1 | 2/2002 | Shinohara et al. | |
| 7,703,774 B2* | 4/2010 | Awtar et al. | 277/412 |
| 8,272,644 B1* | 9/2012 | Aho et al. | 277/355 |
| 8,393,859 B1* | 3/2013 | Dillon | 415/173.5 |
| 8,690,158 B2* | 4/2014 | Beeck | 277/355 |
| 2008/0169614 A1 | 7/2008 | Awtar et al. | |
| 2009/0322038 A1 | 12/2009 | Wright | |

FOREIGN PATENT DOCUMENTS

EP  0 933 567 A2  8/1999
(Continued)

OTHER PUBLICATIONS

Feb. 17, 2012 Search Report issued in British Patent Application No. GB1119526.0.
(Continued)

*Primary Examiner* — Gilbert Lee
(74) *Attorney, Agent, or Firm* — Oliff PLC

(57) ABSTRACT

A leaf seal has a pair of annular packs of stacked leaves. Each pack is mountable to one of the components with its leaves extending towards the other component such that the leaf edges of at least one of the packs are presented for wiping contact with the other component. The packs are axially spaced from each other by a controlled axial clearance. Within each pack the leaves are stacked face-to-face such that neighboring leaves are separated from each other by interleaf gaps which allow an axial leakage flow through the seal. Further, within each pack the packs are positioned such that, when viewed in the axial direction, the leaves of each pack of the pair substantially obscure the interleaf gaps of the other pack of the pair. The controlled axial clearance is the dominant flow restriction in the seal determining the amount of leakage flow through the seal.

20 Claims, 7 Drawing Sheets

(56) References Cited

FOREIGN PATENT DOCUMENTS

| EP | 1 013 975 | A1 | 6/2000 |
|----|-----------|----|--------|
| EP | 1 900 893 | A1 | 3/2008 |
| EP | 1 900 983 | A1 | 3/2008 |
| EP | 2 206 938 | A2 | 7/2010 |
| FR | 2 650 048 | A1 | 1/1991 |
| GB | 2 413 602 | A  | 11/2005 |
| WO | WO 2004/088180 | A2 | 10/2004 |

OTHER PUBLICATIONS

Feb. 28, 2012 Search Report issued in British Patent Application No. GB1119528.6.
U.S. Appl. No. 13/673,527; filed Nov. 9, 2012; Jahn.
Feb. 13, 2013 European Search Report issued in European Patent Application No. EP 12 19 1772.
Feb. 13, 2013 European Search Report issued in European Patent Application No. EP 12 19 1771.

* cited by examiner

LEAF SEAL

FIELD OF THE INVENTION

The present invention relates to a leaf seal for effecting a seal between two coaxial, relatively rotating components.

BACKGROUND OF THE INVENTION

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Leaf seals are formed from sections of leaf material appropriately presented in order to create a seal surface from juxtaposed leaf edges of respective leaves in an assembly. Typically the leaves are arranged circumferentially about a rotating shaft in order to present the leaf edges and therefore the seal surface towards that shaft in order to provide a seal barrier. Typically, spacer members are provided between each leaf in order to correctly arrange the seal elements for presentation of the leaf edges and therefore the seal surface. These spacers may be independent components or integrally formed with each leaf. The leaf edges and so the seal surface effectively floats upwards and downwards relative to a rotating surface.

In a gas turbine engine, leaf seals may be used to form a seal between a static component and a rotating component, between two relatively rotating components, or even between two static components in order to maintain a relatively high pressure on one side of the seal and relatively low pressure on the other. FIG. 2, which shows schematically, for example, a cut-away perspective view of a portion of a leaf seal assembly 31 comprises leaves 32 extending from spacer elements 33 secured in a housing comprising a backing ring 34 with coverplates 35. The leaves 32 present leaf edges 36 towards a surface 37 of a rotating component generally rotating in the direction depicted by arrowhead 38. The leaves 32, and in particular the leaf edges 36 of the leaves 32 act against the surface 37 in order to create a seal across the assembly 31. Each leaf 32 is generally compliant in order to adjust with rotation of the surface 11 to ensure that a good sealing effect is created. The spacers 33 are generally required in order to ensure that flexibility is available to appropriately present the leaves 32 towards the surface 37 which, as illustrated, is generally with an inclined angle between them.

U.S. Pat. No. 6,267,381 proposes providing two sets of seal elements in tandem. For example, FIG. 3 shows schematically a longitudinal cross-section through a seal formed by annular leaf packs 56, 58. In each pack, leaves 46 extend between a stationary outer housing 44 to provide leaf edges that make wiping contact with shaft 42. The leaf packs are axially separated by a clearance 60. Coverplates 62 are located upstream and downstream of the leaf packs and separated therefrom by distances 64.

Leaf seals such as those shown in FIGS. 2 and 3 rely on their coverplates to block the bulk of the flow area through the leaf pack(s), flow area being strongly linked to seal leakage performance. The coverplates immediately upstream and downstream of the leaf pack(s) allow the direct flow area through the leaf pack(s) to be reduced, as the coverplates cover much of the interleaf gaps, which are generally largest close to the leaf root. Reducing the coverplate to leaf pack distance further decreases the seal leakage, as it reduces the amount of air that can flow radially outwards or inwards in the space between each coverplate and the adjacent leaf pack. Hence in order to minimise leakage it is conventionally desirable to minimise the coverplate to leaf pack distances.

However, such coverplates also influence the blow up and blow down performance of the seal (as discussed, for example in H. Nakane et al., *The Development of High-Performance Leaf Seals*, Trans. ASME, Vol. 126, April 2004, pp. 342-350). To control blow down and blow up, the ratio of the front coverplate to leaf pack distance and the rear leaf pack to coverplate distance needs to be controlled accurately. Excessive blow down can lead to accelerated leaf wear and excessive blow up leads to increased leakage.

Due to manufacturing tolerances that apply during leaf pack and coverplate manufacture, this creates a design conflict. In particular, if both distances are small (e.g. having a size which is similar to manufacturing tolerances) the leakage performance is good, but the gap ratio and hence blow up and blow down control are poor. Similarly if both gaps are large (e.g. having a size which is bigger than manufacturing tolerances) the blow up and blow down control is good, while the leakage performance is poor.

SUMMARY OF THE INVENTION

An aim of the present invention is to provide performance improvements in leaf seals.

The present invention provides a leaf seal for effecting a seal between two coaxial, relatively rotating components, the leaf seal having a pair of annular packs of stacked leaves, each pack being mountable to one of the components with its leaves extending towards the other component such that the leaf edges of at least one of the packs are presented for wiping contact with the other component, and the packs being axially spaced from each other by a controlled axial clearance;

wherein within each pack the leaves are stacked face-to-face such that neighbouring leaves are separated from each other by interleaf gaps which allow an axial leakage flow through the seal, and the packs are positioned such that, when viewed in the axial direction, the leaves of each pack of the pair substantially obscure the interleaf gaps of the other pack of the pair; and wherein the controlled axial clearance is the dominant flow restriction in the seal determining the amount of leakage flow through the seal.

Other restrictions in the seal include the interleaf gaps of each pack, and, if there are coverplates at the ends of the seal, the flow paths around the coverplates from or to the adjacent packs. However, the controlled axial clearance should provide a greater restriction on the amount of leakage flow through the seal than any one of these.

Advantageously, by making the controlled axial clearance the dominant flow restriction, it is possible, without affecting leakage performance, to increase the distances between any coverplates which may be present and the adjacent packs. This can lead to better control of the blow up and blow down characteristic of the seal as the nominal gaps can be made larger than manufacturing tolerances. Indeed, it can be possible to avoid using either or both coverplates.

Optional features of the invention will now be set out. These are applicable singly or in any combination with the invention as described above.

Preferably, each pack is mountable to one of the components such that the leaf edges of that pack are presented for wiping contact with the other component.

Preferably, the controlled axial clearance is specified such that, in use, the pressure drop across the controlled axial clearance is at least 50%, and more preferably at least 60, 70, 80 or 90%, of the total pressure drop across the seal.

The controlled axial clearance is typically less than the value of $A/(2L)$ for each pack of the pair, where A is the area of the individual interleaf gaps for the respective pack when viewed in the axial direction, and L is the length of the individual leaves for the respective pack on a transverse cross-section therethrough. Preferably, the controlled axial clearance is less than the value of $\frac{1}{2}A/(2L)$, $\frac{1}{4}A/(2L)$ or $\frac{1}{8}A/(2L)$ for each pack of the pair.

The leaf seal may further have a respective annular coverplate at either or both axial ends of the seal, the or each coverplate being axially spaced from the nearest annular pack of stacked leaves by a respective axial distance, and, when viewed in the axial direction, the or each coverplate covering at least a portion of the radial extent of the nearest pack. However, the controlled axial clearance is specified such that it is the dominant flow restriction in the seal determining the amount of leakage flow through the seal, and thus the axial distance of the or each coverplate can be greater than that of conventional coverplates. Alternatively or additionally, the radial coverage of the or each coverplate can be less than that of conventional coverplates. In these ways, the blow up and blow down control of the seal can be made much less sensitive to differences in the manufacturing tolerances of the coverplates. The or each coverplate typically forms an annular passage between a surface of the other component and an edge of the coverplate proximal that surface. Preferably, the controlled axial clearance is less than the value of $(NA'+R)/(N2L)$ for the or each coverplate, where R is the cylindrical flow area for radial flow passing between the respective annular passage and the space formed between the coverplate and the adjacent leaf pack, A' is the area of the individual interleaf gaps for the adjacent pack not blocked by the respective coverplate when viewed in the axial direction, and L is the length of the individual leaves for the adjacent pack on a transverse cross-section therethrough. Preferably, the controlled axial clearance is less than the value of $\frac{1}{2}(NA'+R)/(N2L)$, $\frac{1}{4}(NA'+R)/(N2L)$ or $\frac{1}{8}(NA'+R)/(N2L)$ for the or each coverplate.

Within at least one of the packs (and preferably within each pack) a spacer element may extend laterally (i.e. in the axial direction) from a root portion of each leaf to interpose between neighbouring leaves of the other pack. The spacer elements can conveniently form the interleaf gaps and ensure that the packs are positioned such that, when viewed in the axial direction, the leaves of each pack of the pair substantially obscure the interleaf gaps of the other pack of the pair.

The leaf seal may further have one or more further annular packs of stacked leaves forming one or more further pairs of adjacent packs, each further pack being mountable to one of the components with its leaves extending towards the other component, and the packs of the or each further pair being axially spaced from each other by a respective further axial clearance; wherein within each further pack the leaves are stacked face-to-face such that neighbouring leaves are separated from each other by interleaf gaps which allow the leakage flow through the seal. Typically, the or each further pack is positioned such that, when viewed in the axial direction, within the or each further pair the leaves of each pack substantially obscure the interleaf gaps of the adjacent pack. In this case, within the or each further pair a spacer element may extend laterally from a root portion of each leaf of at least one of the packs (and preferably each pack) to interpose between neighbouring leaves of the adjacent pack. The leaf edges of the or each further pack may be presented for wiping contact with the other component.

The controlled axial clearance may be specified relative to the or each further axial clearance such that the controlled axial clearance is the single dominant flow restriction in the seal determining the amount of leakage flow through the seal. For example, even with the presence of one or more further pairs of packs, the pressure drop across the controlled axial clearance may be at least 30%, and preferably at least 40, 50, 60, 70, 80 or 90%, of the total pressure drop across the seal.

In one example, the leaf seal can have three annular packs of stacked leaves (i.e. a first end pack, a central pack, and a second end pack), each pack being mounted to one of the components with its leaves extending towards the other component. The three packs form a first end pair of packs (from the first end pack and the central pack) and a second end pair of packs (from the central pack and the second end pack). The first end pair provides a first axial clearance and the second end pair provides a second axial clearance. Within each pair, the packs are positioned such that, when viewed in the axial direction, the leaves of each pack of the pair substantially obscure the interleaf gaps of the other pack of the pair. The leaves of at least the central pack (and generally also the leaves of the first and second end packs) are presented for wiping contact with the other component. One of the first and second axial clearances will then be the dominant flow restriction.

The or each further axial clearance may be less than the value of $A/(2L)$ for each pack of the its respective pair, and preferably is less than $\frac{1}{2}A/(2L)$, $\frac{1}{4}A/(2L)$ or $\frac{1}{8}A/(2L)$.

When the leaf seal has one or more further annular packs of stacked leaves, the leaf seal may not have annular coverplates at the axial ends of the seal to cover at least portions of the radial extents of the nearest packs. Instead, the blow up and blow down performance of the seal may be determined by adjusting the respective axial clearances of the outer pairs of packs (i.e. the two pairs respectively at the axial ends of the seal). In a leaf seal having three annular packs of stacked leaves, these are simply the first and second axial clearances. In a leaf seal without annular coverplates, within the outer packs (i.e. within the two packs respectively at the axial ends of the seal) the leaf edges proximal to the other component are preferably spaced from the other component, i.e. the proximal leaf edges do not make wiping contact with the other component such that respective annular passages are formed between the other component and the leaf edges of the outer packs. Adjusting the extent of the spacing of the leaf edges from the other component can be an additional or alternative way of determining the blow up and blow down performance of the seal. Another option is to have an annular coverplate at one axial end of the seal to cover at least a portion of the radial extent of the nearest pack, but to have no corresponding annular coverplate at the other axial end of the seal. An annular passage can then be formed between the other component and the leaf edges of the outer pack at the axial end of the seal with no annular coverplate.

Particularly when an outer pack takes the role of a coverplate as described in the previous paragraph, the outer pack is preferably configured such that it has a relatively small total interleaf flow area. This may be achieved by using thick leaves, packed so that they interfere (contact) with their neighbouring leaves at the leaf edges proximal to the other component. As such leaf packs are typically relatively uncompliant to radial incursions, the radial distance between the proximal edges and the other component is preferably set so to completely avoid contact during operation. More generally, however, the any one of the leaf packs of the seal may have leaf thicknesses which differ from the leaf thicknesses of other leaf pack or packs of the seal.

In general, when viewed in the axial direction, the total flow area of the interleaf gaps of the or each outer pack is less than 50% of the total flow area of the interleaf gaps of the or each inner pack.

Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
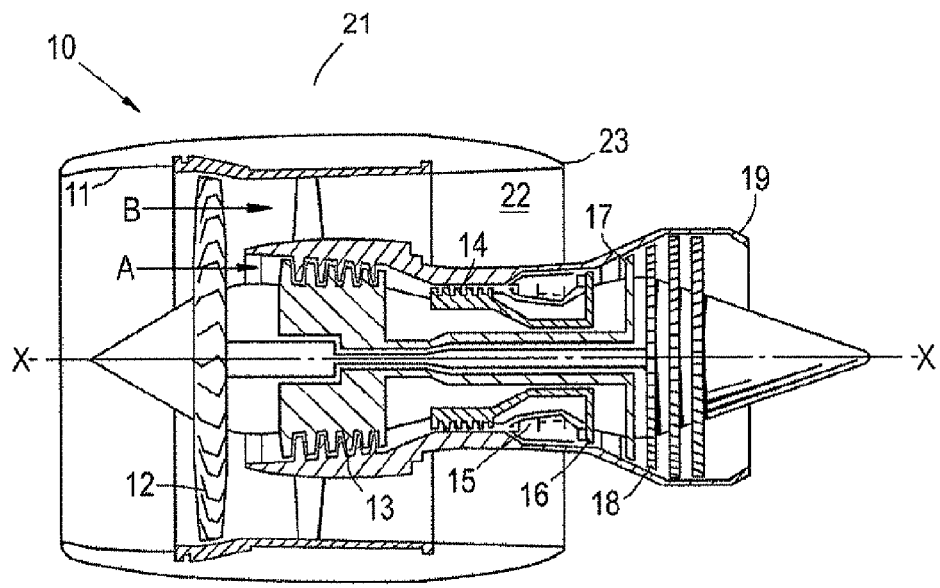
FIG. 1 shows a schematic longitudinal cross-section through a gas turbine engine.
Figure 2:
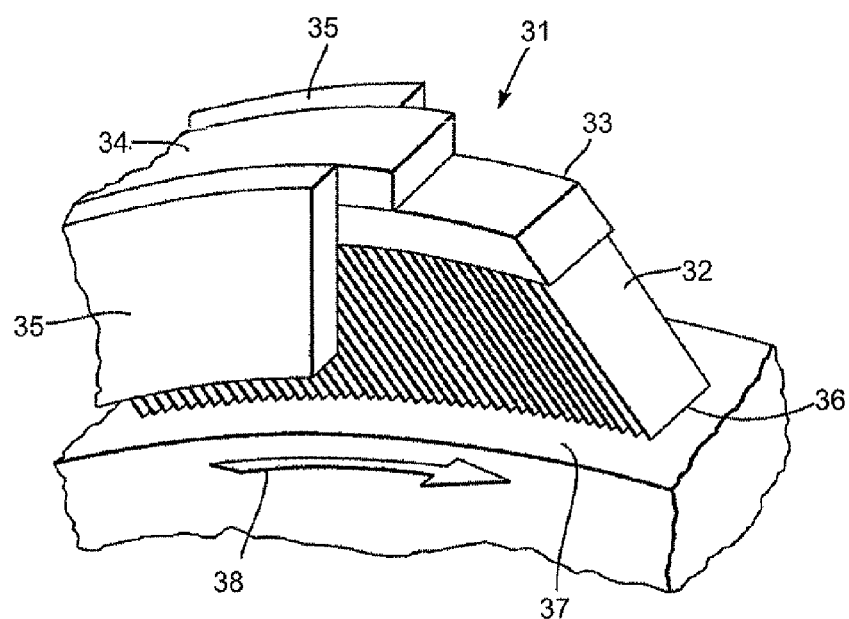
FIG. 2 shows schematically a cut-away perspective view of a portion of a leaf seal assembly.
Figure 3:
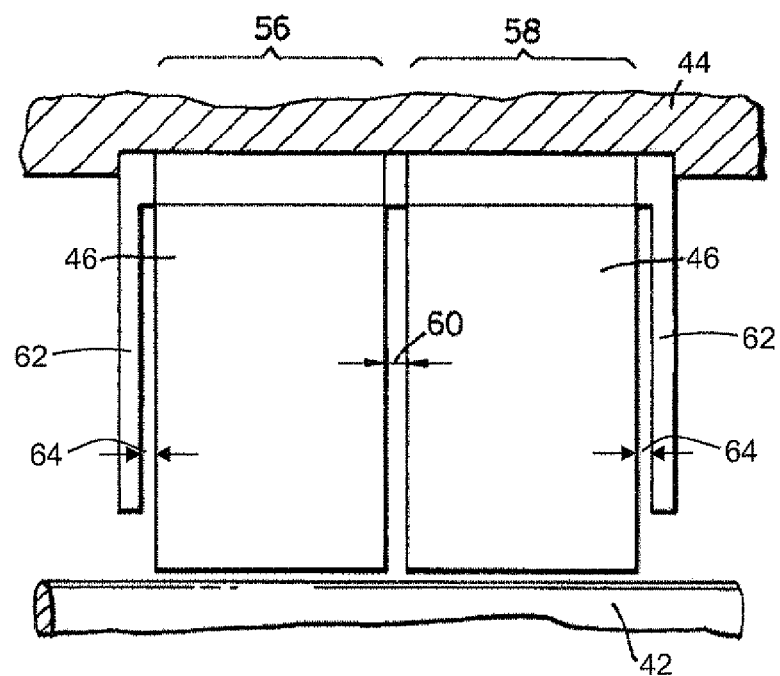
FIG. 3 shows schematically a longitudinal cross-section through a seal formed by tandem annular leaf packs.
Figure 4:
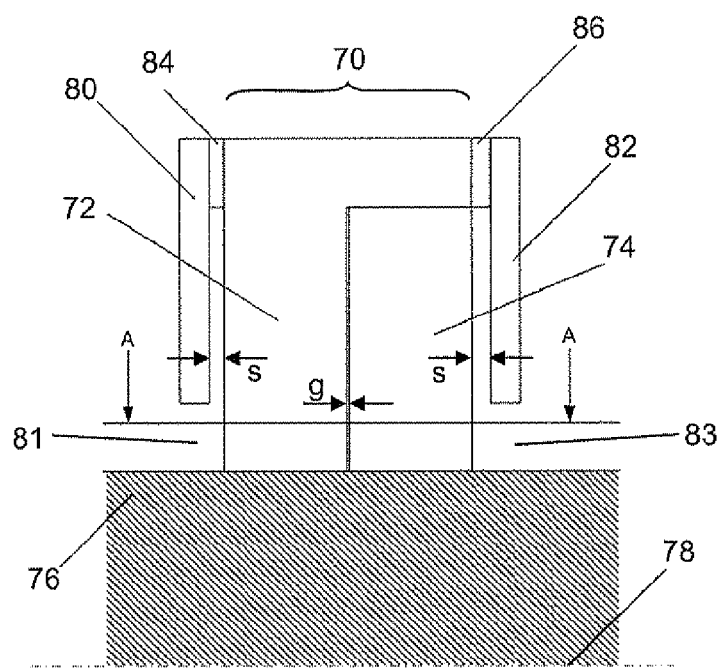
FIG. 4 shows schematically, a longitudinal cross-section through a seal according to a first embodiment of the present invention.

FIG. 4 shows schematically a longitudinal cross-section through a seal according to a first embodiment of the present invention. The seal has a pair 70 of annular packs of stacked leaves. The leaves 72, 74 of each pack are mounted to a radially outer stationary housing (not shown) and have leaf edges that make wiping contact with a radially inner rotor 76 that rotates about axis 78. The packs are axially spaced from each other by a controlled axial clearance g. Upstream and downstream annular coverplates 80, 82 extend radially inwards from the housing to cover a portion of the radial extent of the adjacent pack. Respective annular passages 81, 83 are formed between the surface of the rotor 76 and the edges of the coverplates proximal the rotor. Respective spacers 84, 86 axially space the coverplates from the packs by distances s.

Figure 5:
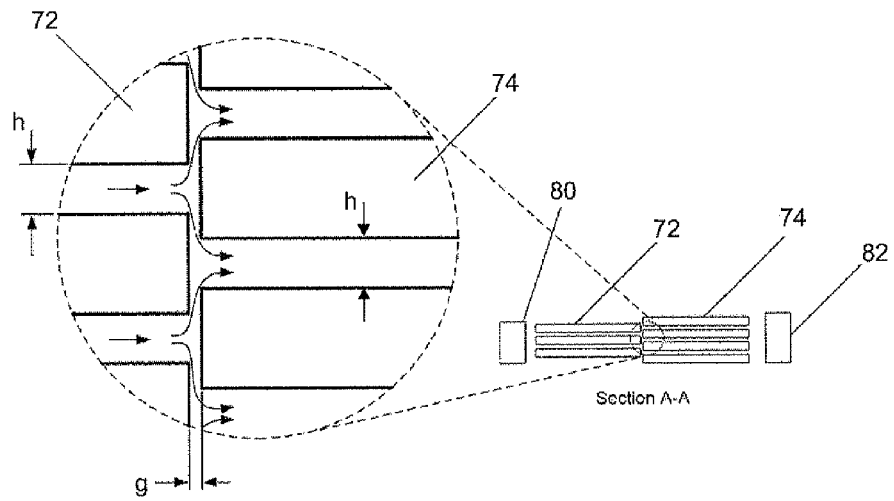
FIG. 5 shows schematically a tangential cross-section through the leaf packs of the seal of FIG. 4 at radius A-A, with a close-up view of the region of axial clearance between the packs.

FIG. 5 shows schematically a tangential cross-section through the packs at radius A-A, with a close-up view of the region of axial clearance g. The leaves are stacked in each pack face-to-face such that neighbouring leaves are separated from each other by interleaf gaps h which allow an axial leakage flow (arrowed) through the seal. Further, the two leaf packs are circumferentially positioned such that, when viewed in the axial direction, the leaves from the first pack block the interleaf gaps h in the second pack and vice versa. Thus in order for the leakage flow to pass from one pack to the other, it has to negotiate a tortuous route through the axial clearance g.

The leakage flow has to pass through a number of restrictions en route through the seal. A first restriction is the path around the radially inner edge of the upstream coverplate 80 and into space s between that coverplate and the first pack of leaves 72. A second restriction is the passage through the interleaf gaps h of the first pack of leaves 72. A third restriction is the route through the axial clearance g. A fourth restriction is the passage through the interleaf gaps h of the second pack of leaves 74. A fifth restriction is the path from space s between the second pack of leaves 74 and the downstream coverplate 82 and around the radially inner edge of that coverplate. However, advantageously, the dominant flow restriction in the seal determining the amount of leakage flow is the axial clearance g. This allows the distances s between coverplates and the leaf packs to be increased without affecting the leakage performance, resulting in better control of the blow up and blow down characteristic of the seal.

To ensure that the axial clearance g is the dominant restriction, consideration can be given to the flow characteristics through the interleaf gaps h and the axial clearance g. More particularly, for a given pressure difference driving the leakage flow through one of the interleaf gaps, the amount of flow through the gap is proportional to:

$$C_h \int_0^L h \cdot dx \quad (1)$$

where $C_h$ is the flow coefficient for the gap h, and x is distance on a transverse cross-section through the seal from the leaf edges making wiping contact with the rotor 78 (at x=0) radially outwardly to the end of the gap (at x=L). This can be rewritten as:

$$C_h A \quad (2)$$

where A is the area of the gap h on the transverse cross-section. The corresponding expression for the same flow through axial clearance g is:

$$C_g 2gL \quad (3)$$

where $C_g$ is the flow coefficient for the axial clearance. Thus, for the axial clearance g to be the dominant restriction, the following inequality should apply:

$$C_g 2gL < C_h A \quad (4)$$

Further, when g is the dominant restriction, $C_g$ generally takes a value of from 0.5 to 1 while $C_h$ takes a value of from 0.5 to 1. Thus it follows from inequality (4) that g should preferably be less than the value of A/(2L) for both packs. Smaller values of g (e.g. so that g is less than ½A/(2L), ¼A/(2L) or ⅛A/(2L) can increase the dominance of flow through the axial clearance rather than through the interleaf gaps of the packs.

Consideration can also be given to the flow characteristics around the coverplates 80, 82 through the respective annular passage 81, 83 relative to the flow through the axial clearance g. If there are N leaves 72, 74 in each pack, the total flow through the axial clearance g is given by:

$$NC_g 2gL \quad (5)$$

while the flow out of the annular passage 81 or into the annular passage 83 is given by:

$$C_R R + C_h NA' \quad (6)$$

where R is the cylindrical flow area for radial flow passing from the annular passage 81 into the corresponding space s or into the annular passage 83 from the corresponding space s, $C_R$ is the corresponding flow coefficient, and A' is the portion of the area A of each interleaf gap h of the adjacent pack that is not blocked by the respective coverplate when viewed along the axial direction of the seal. Thus again, for the axial clearance g to be the dominant restriction, the following inequality should preferably apply:

$$NC_g 2gL < (C_R R + C_h NA') \quad (7)$$

$C_g$, $C_h$ and $C_R$ generally take values of from 0.5 to 1. Thus it follows from equality (7) that g should preferably be less than (NA'+R)/(N2L). Again, smaller values of g (e.g. so that g is less than ½(NA'+R)/(N2L), ¼(NA'+R)/(N2L) or ⅛ (NA'+R)/(N2L)) can increase the dominance of flow through the axial clearance.

Typical values for the axial clearance g relative to a typical leaf seal for a gas turbine, which might have an axial length of 4 to 5 mm and 20 to 40 mm radial length leaves, are in the range from 0.001 mm to 0.25 mm. The lower limit is set by manufacturing tolerances, as contact between the leaf packs is undesirable and must be avoided. The distances s between the coverplates 80, 82 and the leaf packs, set by spacers 84, 86, can then typically range from 0.1 mm to 2 mm. However, consistent with the axial clearance being the dominant restriction, preferably the axial clearance is at least a factor of 2, and more preferably at least a factor of 4 or 8, less than the distances s. Preferably, the pressure drop across the axial clearance is at least 50% of the total pressure drop across the seal.

There are a number of possibilities for positioning the leaf pack in close proximity while ensuring that the leaves of each pack obscure the interleaf gaps of the other pack. For example, one option is to place two leaf packs, each with an identical number of leaves, adjacent each other with the leaves and interleaf gaps h of both packs axially aligned, and then to manually clock the packs so that they move out of alignment. A spacer can be located between the packs to set the axial clearance g between the packs.

A preferred option, however, is to use L-shaped lamellae, as shown in FIG. 6(a), in which a spacer element 88 extends laterally from the root portion of each leaf 72, 74. As shown in FIG. 6(b), the lamellae are then assembled such that the spacer elements of the leaves 72 in the first leaf pack form spacers between the leaves 74 of the second leaf pack, and vice versa. Further by setting the length M of the lamellae along their upper edges to be slightly larger than twice the width N of the leaves, the axial clearance g between the packs can be set without recourse to a spacer between the packs, thereby simplifying manufacture of the seal. Advantageously, by making the spacers as extensions from the leaves, improved tolerance control can be achieved. In particular, the lamellae are typically stamped or etched from sheet material, and in such a process tolerances can be controlled to better than 0.005 mm, ensuring that key features such as the axial clearance g can be set with high accuracy.

Preferential thinning of the spacer elements 88 relative to the rest of the leaves 72, 74 can be used to reduce the interleaf gaps h.

Figure 6:
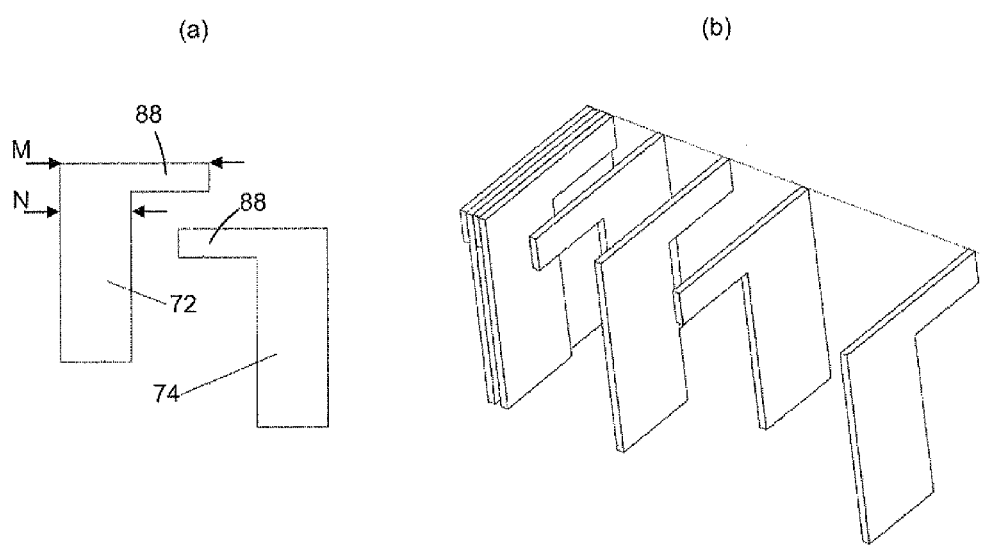
FIG. 6 shows schematically (a) L-shaped lamellae in which a spacer element extends laterally from the root portion of each leaf, and (b) the assembly of the L-shaped lamellae into two leaf packs.

In FIGS. 4 to 6, the leaves 72, 74 have the same width N. However, in other embodiments, the widths of the leaves in the different packs can be different.

Figure 7:
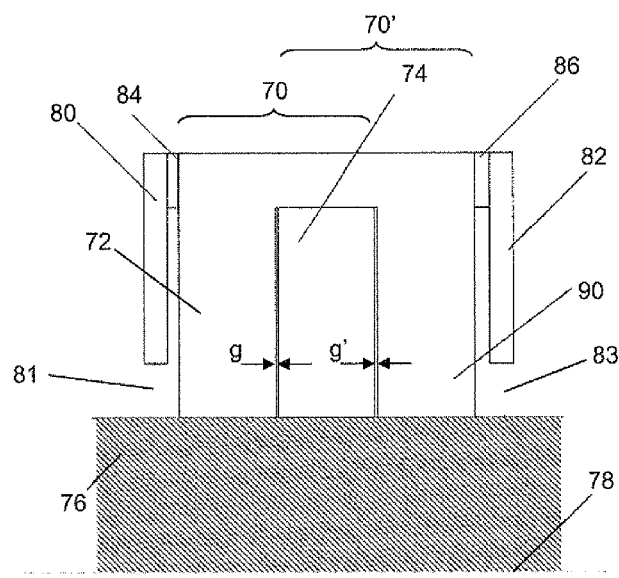
FIG. 7 shows schematically a longitudinal cross-section through a seal according to a second embodiment of the present invention.

The basic concept of controlling the axial clearance between a pair of leaf packs so that it is the dominant flow restriction in the seal can be extended to seals having three or more leaf packs and hence having further pairs of packs. For example, FIG. 7 shows schematically a longitudinal cross-section through a seal according to a second embodiment of the present invention. In FIG. 7, features corresponding to features of the first embodiment have the same reference numbers as those features of the first embodiment. The seal has a further annular pack of stacked leaves 90 mounted to the radially outer stationary housing and having leaf edges that make wiping contact with the radially inner rotor 76. The leaves 72, 74 thus form a first 70 pair of packs, and the leaves 74, 90 form a second 70' pair of packs.

The packs of the first pair are axially spaced from each other by an axial clearance g, and the packs of the second pair are axially spaced from each other by an axial clearance g'.

Figure 8:
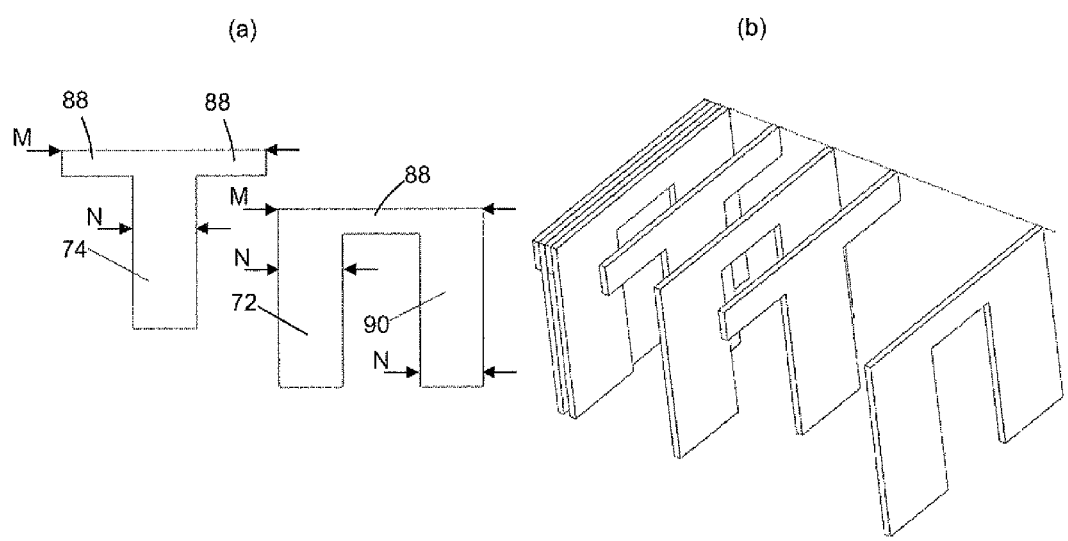
FIG. 8 shows schematically (a) a T-shaped lamella and an inverted-U-shaped lamellae, and (b) the assembly of the T-shaped lamellae and inverted-U-shaped lamellae into three leaf packs of the second embodiment.

To form the seal, T-shaped lamellae and inverted-U-shaped lamellae can be used, as shown in FIG. 8(a). Each T-shaped lamella provides a leaf 74 and two spacer elements 88 which extending laterally from either side of the root portion of the leaf. Each inverted-U-shaped lamella provides two leaves 72, 90 and a spacer element which bridges the root portions of the leaves. As shown in FIG. 8(b), the lamellae are assembled such that the spacer elements of the T-shaped lamellae form spacers between the leaves 72, 90 of the outer leaf packs, and the spacer elements of the inverted-U-shaped lamellae form spacers between the leaves 74 of the central leaf pack. The lengths M along the upper edges of both types of lamellae are identical, and the axial clearances g, g' between the packs are determined by the widths N of the leaves 72, 74, 90 relative to M.

The axial clearances g, g' can be equal or similar in size, in which case they can form flow restrictions in the seal which are substantially equally dominant. For example, the combined pressure drop across both axial clearances may be at least 50% of the total pressure drop across the seal. Alternatively, one of the axial clearances can be the dominant flow restriction. In this case it may produce at least 30% of the total pressure drop across the seal.

Figure 9:
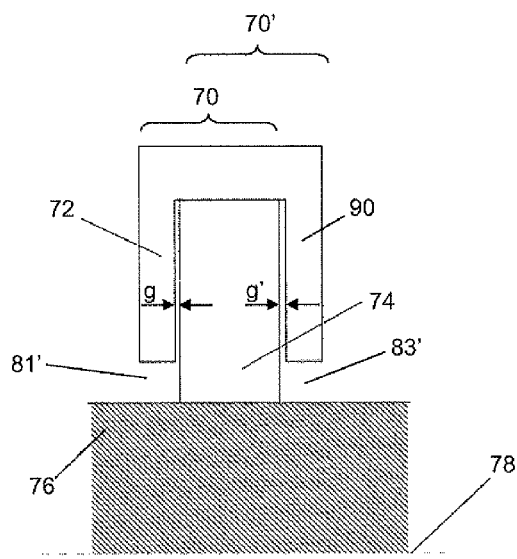
FIG. 9 shows schematically a longitudinal cross-section through a seal according to a third embodiment of the present invention.
Figure 10:
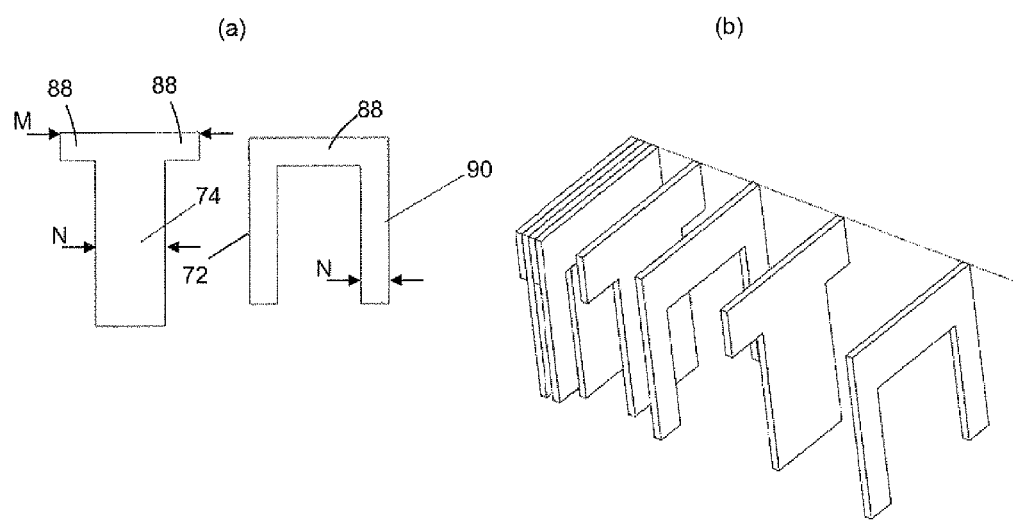
FIG. 10 shows schematically (a) a T-shaped lamella and an inverted-U-shaped lamella, and (b) the assembly of the T-shaped lamellae and inverted-U-shaped lamellae into three leaf packs of the third embodiment.

FIG. 9 shows schematically a longitudinal cross-section through a seal according to a third embodiment of the present invention. FIG. 10 shows schematically (a) a T-shaped lamellae and an inverted-U-shaped lamellae, and (b) the assembly of the T-shaped lamellae and inverted-U-shaped lamellae into three leaf packs of the third embodiment. In FIGS. 9 and 10, features corresponding to features of the first and second embodiments have the same reference numbers as those features of the first and second embodiments. The third embodiment is similar to the second embodiment except that the seal has no coverplates and no coverplate spacers. Further, the leaves 72, 90 of the outer leaf packs are shorter in radial length and narrower in width N. Because of their shortened length, the edges of these leaves which are proximal to the rotor 76 are spaced therefrom, i.e. the leaves do not make wiping contact with the rotor 76. That is, respective annular passages 81', 83' are formed between the surface of the rotor 76 and the edges of the leaves of the outer leaf packs which are proximal the rotor. The amount by which the leaf edges of the outer leaf packs are spaced from the rotor can be different as between the two packs, i.e. annular passages 81', 83' can have different outer diameters.

The outer leaf packs effectively perform the role of the coverplates of the second embodiment, but the axial clearances g, g' nonetheless determine the blow down and blow up performance of the seal. However, because the ratio of the axial clearances can be controlled accurately, blow down and blow up performance of the seal can be less susceptible to manufacturing variation than is the case for conventional seals where blow down and blow up performance is determined by the ratio of coverplate to leaf pack distances.

In a variant of the third embodiment, it is possible for a coverplate to be provided at the upstream or downstream end of the seal, and for the other end of the seal to have no coverplate. The end of the seal without a coverplate can then have an end pack in which an annular passage is formed between the surface of the rotor and the edges of the leaves of that pack which are proximal the rotor.

Figure 11:
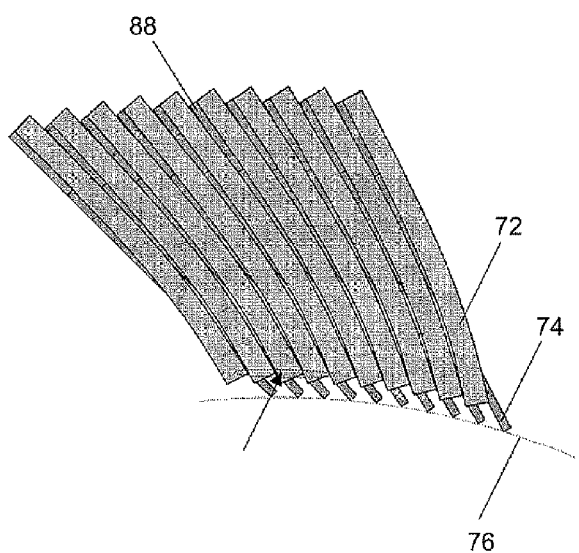
FIG. 11 shows schematically an end-on view of a variant of the seal of the third embodiment.

An option that is generally available to all the embodiments is to form pairs of annular packs in which the leaves of one the packs of the pair have a different thickness to the leaves of the other pack of the pair. This can lead to a leaf thickness to interleaf gap ratio at the root for one of the packs that is different to the corresponding ratio for the other pack. The different leaf pack geometries that result can have useful properties. For example, using thicker leaves 72, 90 for the outer leaf packs of the third embodiment can cause the leaves of those packs to make contact (arrowed) with their neighbouring leaves in the pack at their edges proximal the rotor 76, as shown in the schematic end-on view of FIG. 11. This reduces the radial compliance of the outer leaf packs, but as they do not make wiping contact with the rotor 76, this is acceptable from the point of view of the mechanical behaviour of the outer packs. In addition, the leakage flow through the interleaf gaps h of the outer leaf packs is reduced, allowing the outer leaf packs to perform the role of coverplates more effectively.

Figure 12:
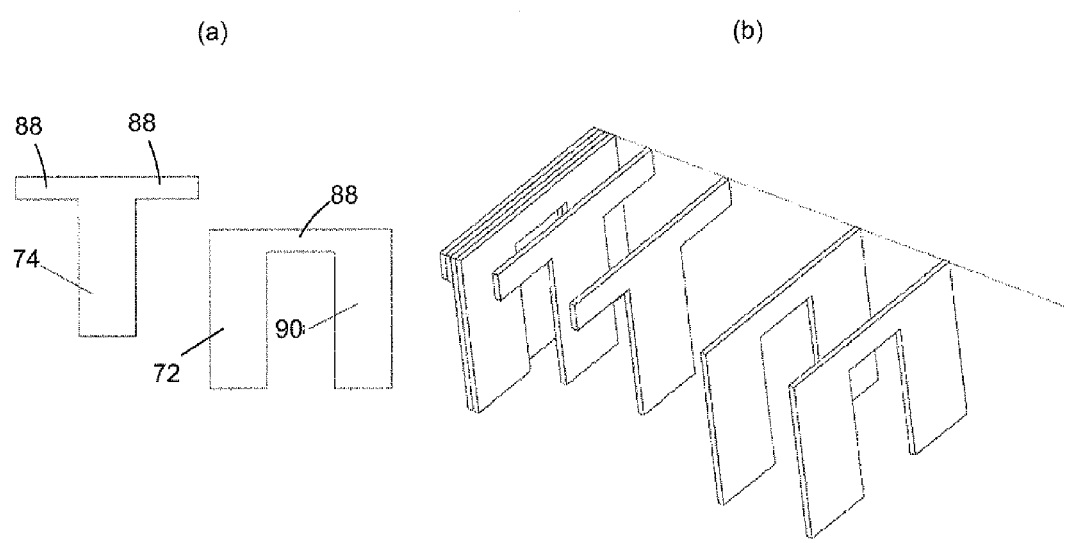
FIG. 12 shows schematically (a) a T-shaped lamella and an inverted-U-shaped lamella, and (b) the assembly of the T-shaped lamellae and inverted-U-shaped lamellae into three leaf packs of a variant of the seal of the second embodiment

The concept of contacting neighbouring leaves in a pack can be extended further. FIG. 12 shows schematically (a) a T-shaped lamellae and an inverted-U-shaped lamellae, and (b) the assembly of the T-shaped lamellae and inverted-U-shaped lamellae into three leaf packs of a variant of the seal of the second embodiment. In this variant, to control leaf pack vibrations, instead of alternately stacking individual T-shaped lamellae and inverted-U-shaped lamellae during pack assembly, pairs of T-shaped lamellae and inverted-U-shaped lamellae are alternately stacked. The assembly of FIG. 12 contains two T-shaped lamellae, followed by two inverted-U-shaped lamellae, but other combinations are also possible (e.g. two T-shaped lamellae followed by three inverted-U-shaped lamellae).

Figure 13:
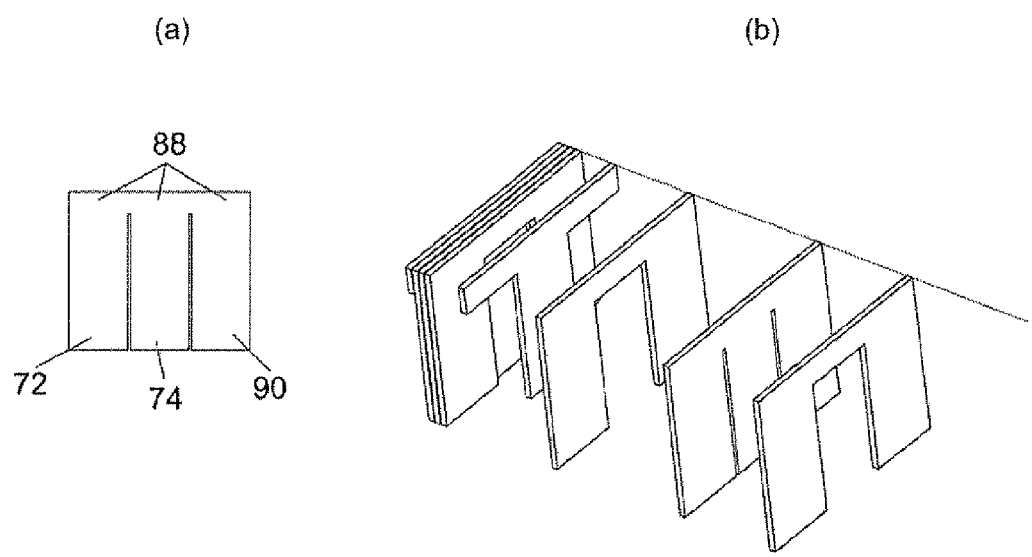
FIG. 13 shows schematically (a) an M-shaped lamella, and (b) the assembly of T-shaped lamellae, inverted-U-shaped lamellae and the M-shaped lamellae into three leaf packs of a further variant of the seal of the second embodiment.

In addition to the inverted-U-shaped and T-shaped lamellae, it may also be beneficial to use a 3-pronged, M-shaped lamella. FIG. 13 shows schematically (a) an M-shaped lamella, and (b) an assembly of T-shaped lamellae, inverted-U-shaped lamellae and the M-shaped lamellae into three leaf packs of a further variant of the seal of the second embodiment. Each M-shaped lamella provides three leaves 72, 74, 90 and three spacer elements 88. By interspersing inverted-U-shaped, T-shaped and M-shaped lamellae as shown in FIG. 13(b), improved leakage characteristics and vibration resistance compared to the seal of FIG. 12 may be achieved, whilst still maintaining tight axial clearances g, g' between the three leaf packs.

While the invention has been described in conjunction with the exemplary embodiments described above, many equivalent modifications and variations will be apparent to those skilled in the art when given this disclosure. For example, in the above embodiments, the leaf packs are mounted to a radially outer housing and their leaves extend towards an inner rotor. However, in other embodiments, the packs could be mounted to a radially inner component and their leaves extend towards an outer component. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A leaf seal for effecting a seal between two coaxial, relatively rotating components, the leaf seal having a first and second annular pack of stacked leaves forming a pair, each pack being mountable to one of the components with its leaves extending towards the other component such that the leaf edges of at least one of the packs are presented for wiping contact with the other component, and the packs being axially spaced from each other by a controlled axial clearance;

wherein within each pack the leaves are stacked face-to-face such that neighbouring leaves are separated from each other by interleaf gaps which allow an axial leakage flow through the seal, and the packs are positioned such that, when viewed in the axial direction, the leaves of each pack of the pair substantially obscure the interleaf gaps of the other pack of the pair;

wherein the controlled axial clearance is the dominant flow restriction in the seal determining the amount of leakage flow through the seal; and wherein the leaves of the first pack are a different thickness when viewed in the axial direction than the leaves of the second pack.

2. A leaf seal according to claim 1, wherein each pack is mountable to one of the components such that the leaf edges of that pack are presented for wiping contact with the other component.

3. A leaf seal according to claim 1, wherein the controlled axial clearance is specified such that, in use, the pressure drop across the controlled axial clearance is at least 50% of the total pressure drop across the seal.

4. A leaf seal according to claim 1, wherein the controlled axial clearance is less than the value of A/(2L) for each pack of the pair, where A is the area of the individual interleaf gaps for the respective pack when viewed in the axial direction, and L is the length of the individual leaves for the respective pack on a transverse cross-section therethrough.

5. A leaf seal according to claim 1, further having a respective coverplate at either or both axial ends of the seal, the or each coverplate being axially spaced from the nearest annular pack of stacked leaves by a respective axial distance(s), and, when viewed in the axial direction, the or each coverplate covering at least a portion of the radial extent of the nearest pack.

6. A leaf seal according to claim 1, wherein within at least one of the packs a spacer element extends laterally from a root portion of each leaf to interpose between neighbouring leaves of the other pack.

7. A leaf seal according to claim 1 further having one or more further annular packs of stacked leaves forming one or more further pairs of adjacent packs, each further pack being mountable to one of the components with its leaves extending towards the other component, and the packs of the or each further pair being axially spaced from each other by a respective further axial clearance;
wherein within each further pack the leaves are stacked face-to-face such that neighbouring leaves are separated from each other by interleaf gaps which allow the leakage flow through the seal.

8. A leaf seal according to claim 7, wherein the or each further pack is positioned such that, when viewed in the axial direction, within the or each further pair the leaves of each pack substantially obscure the interleaf gaps of the adjacent pack.

9. A leaf seal according to claim 8, wherein within the or each further pair a spacer element extends laterally from a root portion of each leaf of at least one of the packs to interpose between neighbouring leaves of the adjacent pack.

10. A leaf seal according to claim 7, wherein the controlled axial clearance is specified relative to the or each further axial clearance such that the controlled axial clearance is the single dominant flow restriction in the seal determining the amount of leakage flow through the seal.

11. A leaf seal according to claim 7 without annular coverplates at the axial ends of the seal to cover at least portions of the radial extents of the nearest packs.

12. A leaf seal according to claim 11, wherein respective annular passages are formed between the other component and the leaf edges of the axially outer packs of the seal.

13. A leaf seal for effecting a seal between two coaxial, relatively rotating components, the leaf seal having a first and second annular pack of stacked leaves forming a pair, each pack being mountable to one of the components with its leaves extending towards the other component such that the leaf edges of at least one of the packs are presented for wiping contact with the other component, and the packs being axially spaced from each other by a controlled axial clearance;
wherein within each pack the leaves are stacked face-to-face such that neighbouring leaves are separated from each other by interleaf gaps which allow an axial leakage flow through the seal, and the packs are positioned such that, when viewed in the axial direction, the leaves of each pack of the pair substantially obscure the interleaf gaps of the other pack of the pair;
wherein the controlled axial clearance is the dominant flow restriction in the seal determining the amount of leakage flow through the seal; and
wherein the leaves of the first pack have a shorter radial length than the leaves of the second pack.

14. A leaf seal according to claim 13, wherein the controlled axial clearance is specified such that, in use, the pressure drop across the controlled axial clearance is at least 50% of the total pressure drop across the seal.

15. A leaf seal according to claim 13, wherein the controlled axial clearance is less than the value of A/(2L) for each pack of the pair, where A is the area of the individual interleaf gaps for the respective pack when viewed in the axial direction, and L is the length of the individual leaves for the respective pack on a transverse cross-section therethrough.

16. A leaf seal according to claim 13, wherein within at least one of the packs a spacer element extends laterally from a root portion of each leaf to interpose between neighbouring leaves of the other pack.

17. A leaf seal according to claim 13 further having one or more further annular packs of stacked leaves forming one or more further pairs of adjacent packs, each further pack being mountable to one of the components with its leaves extending towards the other component, and the packs of the or each further pair being axially spaced from each other by a respective further axial clearance; wherein within each further pack the leaves are stacked face-to-face such that neighbouring leaves are separated from each other by interleaf gaps which allow the leakage flow through the seal.

18. A leaf seal according to claim 17, wherein the or each further pack is positioned such that, when viewed in the axial direction, within the or each further pair the leaves of each pack substantially obscure the interleaf gaps of the adjacent pack.

19. A leaf seal according to claim 17, wherein the controlled axial clearance is specified relative to the or each further axial clearance such that the controlled axial clearance is the single dominant flow restriction in the seal determining the amount of leakage flow through the seal.

20. A leaf seal according to claim 13, wherein the leaves of the first pack are a different thickness when viewed in the axial direction than the leaves of the second pack.

* * * * *